Dec. 16, 1969    F. M. WOOD    3,483,734

PIPELINE PIGGING APPARATUS

Filed Nov. 3, 1967    2 Sheets-Sheet 1

Fenton M. Wood
INVENTOR.

BY:
Arnold, Roylance, Kruger & Durkee
ATTORNEYS

Dec. 16, 1969  F. M. WOOD  3,483,734
PIPELINE PIGGING APPARATUS

Filed Nov. 3, 1967  2 Sheets-Sheet 2

Fenton M. Wood
INVENTOR

BY:
Arnold, Roylance, Kruger & Durkee
ATTORNEYS 3,483,734
PIPELINE PIGGING APPARATUS
Fenton M. Wood, Sugarland, Tex., assignor to American
 Machine & Foundry Company, New York, N.Y.
Filed Nov. 3, 1967, Ser. No. 680,545
Int. Cl. G01m 3/08
U.S. Cl. 73—40.5                                       15 Claims

ABSTRACT OF THE DISCLOSURE

An improved pipeline pig for circumferentially detecting leaks in a pipeline containing L-P or natural gas under a pressure. A plurality of leak detectors, each responsive to temperature differentials adjacent the pipeline wall, are arranged circumferentially about the pig to provide continuous 360 degrees scanning of the pipeline along its length.

BACKGROUND OF THE INVENTION

This invention relates to methods and apparatus for non-destructive testing of materials, and is more particularly directed to improved pigging apparatus for detecting the presence and location of leaks in liquified petroleum and natural gas pipelines.

It is well known that L-P and natural gas is transported from one location to another by means of high pressure pipelines. What is not so well known, however, is that the pressure in a gas pipeline often exceeds 1,000 p.s.i.a., and under such pressures a hole in the pipe as small as a pencil point will constitute a large and dangerous leak.

There are many techniques now in use for detecting the presence of leaks in such pipelines which are buried in the earth. For example, it is well known in this industry that the escaping L-P or natural gas tends to kill all adjacent vegetation. Thus, it is common practice to inspect the surface of the pipeline right-of-way for patches of dead grass or other such vegetation as indications of the presence of leaks. Another such practice is to inject a gaseous tracer such as nitrous oxide or radon into one end of the pipeline and then to survey the pipeline right-of-way with a portable detector such as an infrared detector or a scintillation counter respectively.

Although practices of this type are in common use, they are not completely satisfactory. For instance, it is often that the gas will travel to the surface along an underground channel such as that created by a sewer line or telephone conduit, and thus the patch of dead or dying vegetation will indicate merely the location where the gas reaches the surface. In addition, the pipeline will often pass under highly populated areas, and thus it is often undesirable to use a radioactive tracer material which can endanger life and property.

Accordingly, pipeline pigging apparatus has been developed for electrically and magnetically surveying the length of the pipeline for flaws and defects constituting leaks. Although such equipment has the advantage of indicating the presence of flaws and pits which will eventually become leaks, as well as those flaws and pits which are currently leaking, such apparatus has several disadvantages. In the first place, apparatus of this type merely senses for flaws and pits in the wall of the pipeline, and thus does not distinguish between leaking and non-leaking pits and flaws, etc. In the second place, the accuracy of the sensors usually employed in conventional pigs is somewhat less than might be desired, and an indication of an 80% pit (for example) may be as much as 20% wrong. Thus, a pit in a length of pipe of a wall thickness different from that of adjacent lengths of pipe may be undetected.

Accordingly, it has been proposed in the prior art to incorporate in the pig, in addition to or instead of the aforesaid flaw and pit sensors, direct detectors of fluid leaks in the pipeline wall. For example, reference is had to U.S. Patent No. 3,132,506, which was granted May 12, 1964, to R. A. Pritchett, which discloses a pipeline pig having a pair of spaced-apart packers for establishing a relatively fluid-tight chamber in the section of pipeline defined by the packers. The pig further includes a small diameter passageway having one end communicating with the region of the pipeline behind the pig, and having two branches inside of the pig. One branch of the passageway connects directly to the chamber defined by the packers, and the other branch terminates at a surge chamber inside the pig. The leak detection function is provided by a pair of thermistors, one being interconnected with the first mentioned branch of the passageway and the other being interconnected with the other branch of the passageway.

When the Pritchett pig moves to a section of the pipeline containing a leak, the packers tend to isolate that section except for the passageway. Thus, fluid pressure in the isolated section tends to drop because of the leak, and fluid flow will thereupon occur through the passageway and across the first mentioned thermistor to the isolated leaking section. Since the second branch of the passageway connects to the surge chamber which is isolated from the leaking section of the pipeline, there will be no fluid flow across the second thermistor. Thus, an electrical signal from the first thermistor but not from the second thermistor will provide an indication of a leak in the pipeline at that location.

On the other hand, it is well known that the pig will be subjected to pressure variations which are due to pump impulses and pressure gradients along the pipeline, and which have no relationship to leaks. In such cases, there will be fluid flow equally in both branches of the passageway in the Pritchett pig, and both thermistors will then generate equal output signals. Thus, Pritchett provides a Wheatstone bridge circuit wherein the two thermistors are normally in a balanced condition so that equal thermistor output signals will cancel each other. Accordingly, no spurious signals will be generated due to normal pressure variations in the pipeline. However, when a leak is detected by the sensing thermistor due to fluid flow only in the first branch of the passageway, the circuit will be unbalanced and will produce a recordable indication.

It may be seen that a pipeline pig of the character depicted in the Pritchett patent is a relatively complex device, and thus is subject to malfunctions because of the hard usage which any pigging apparatus must necessarily endure. Moreover, the Pritchett pig basically depends upon the existence (or creation) of fluid flow differentials of substantial magnitude to provide a reliable indication of a leak in the pipe line because small leakages past the rubber cups or seals occur often due to the cup being deformed as it passes over field weld icicles, line debris, or raised seam welds. It is important to detect any leak, no matter how small, since small leaks will permit a large quantity of gas to escape over a period of time, and since small leaks inevitably grow into large leaks. In addition, the medium pressure lines are precisely those pipelines which are usually located in congested areas, and thus it is leaks in the medium pressure lines which are most dangerous to life and property.

SUMMARY OF THE INVENTION

These disadvantages of the prior art are overcome with the present invention, and novel methods and apparatus are provided herein for more accurately investigating and testing gas and L-P pipelines for minute leaks, as well as for flaws and pits and the like which may subsequently develop into leaks. In its preferred embodiment, the present invention includes an improved pig having a magnetizable core, a pair of circular steel brushes for pole pieces to provide uniform circumferential magnetic coupling of the magnetized core to the pipeline, and a circumferential array of detector shoes for complete 360 degree scanning of the inside of the pipeline.

As hereinbefore stated, it is desirable to survey the pipeline for defects as well as for leaks. Accordingly, each detector shoe is preferably provided with one or more flux leakage sensors, eddy current detection coils, magnetometers, or any other flaw detection apparatus of conventional design, and at least one such shoe is also provided with apparatus for detecting actual leakage through the wall of the pipeline.

In its preferred form, the present invention includes leak detection apparatus which comprises a temperature sensing means, such as a thermistor or semi-conductor, which is arranged to directly respond to variations in the temperature of the gas close to the inside surface of the pipeline, rather than to fluid flow variations resulting from pressure fluctuations as in the case of the Pritchett pig hereinbefore described. More particularly, each detector shoe may be provided with a recess in its bottom or contact surface abutting the inside wall of the pipeline, which recess contains a temperature-sensitive device, such as a thermistor or semi-conductor, exposed to the gas adjacent or close to the pipe wall.

In this embodiment of the present invention, a second thermistor may be provided in combination with the thermistor in each shoe, the second thermistor being thermally insulated from any temperature changes occurring inside the pipeline due to normal fluctuations of pipeline pressure. A bridge circuit may be interconnected with the two thermistors whereby an output signal is produced only when the first thermistor is subjected to a temperature drop. This modification in the present invention tends to achieve more precise isolation of the leaking section of the pipe, since the output signal is entirely dependent in this instance upon temperature change due to expansion of the gas or L-P as it escapes through the leak, and is completely unrelated to the rate of fluid flow around the thermistors. Moreover, the small volume of gas isolated in each shoe tends to be less affected by pressure variations in the pipeline, than in the case of a pig constructed in the manner of the prior art, and thus the thermistor output signals generated in the present invention are relatively free of influence from these pressure variations and are accordingly much more accurate.

In another embodiment of the present invention having certain advantages not provided by the previously described embodiment, a detector shoe having wheels or rollers is provided whereby much if not most of the friction (and the heat generated thereby) is eliminated. In this example, at least a small of "standoff" or spacing is necessarily effected between the detector elements and the pipe wall, and thus the accuracy of the flaw detection signal is accordingly limited or reduced where a flux leakage measurement is also sought to be obtained.

On the other hand, in this alternative embodiment the thermistor or temperature sensor need only be disposed in the under portion of the shoe so as to be close to, but not actually urged against the pipe wall. Thus, the temperature sensor is continually exposed directly to fluid immediately adjacent the pipe wall, and thus to fluid which has a temperature nearest to the temperature of the pipe.

As hereinbefore explained, it will be apparent that the temperature of the pipe adjacent a leak will be substantially lower than the temperature of the pipe along fluid-tight sections of the pipeline, due to the refrigerating effect of the fluid escaping through the leak. Accordingly, the fluid in the pipeline adjacent the leak (and especially the fluid adjacent the pipewall surrounding the leak) will have a lower temperature than the fluid in the non-leaking sections of the pipeline, and it is the temperature of this gas adjacent the pipewall immediately surrounding the leak which is sought to be measured by this alternative embodiment of the present invention. Consequently, the recess containing the exposed thermistor or temperature sensor is preferably relatively small and is also preferably located in or adjacent the trailing end of the detector shoe.

Accordingly, it is a feature of the present invention to provide novel pipeline pigging apparatus including temperature sensing detectors for identifying and locating leaks in a pipeline.

It is another feature of the present invention to provide novel pipeline pigging apparatus for identifying and locating flaws, defects, pits, and leaks in a pipeline, and for distinguishing between leaking and non-leaking flaws, pits, cracks, and other such defects.

In addition, it is a further feature of the present invention to provide novel pipeline pigging apparatus for achieving a complete 360 degree scan of the circumference of an L-P or gas-filled pipeline.

These and other objects and features of the present invention will be apparent from the following detailed description, wherein reference is made to the figures in the accompanying drawings.

DESCRIPTION OF PREFERRED EMBODIMENTS

Figure 1:
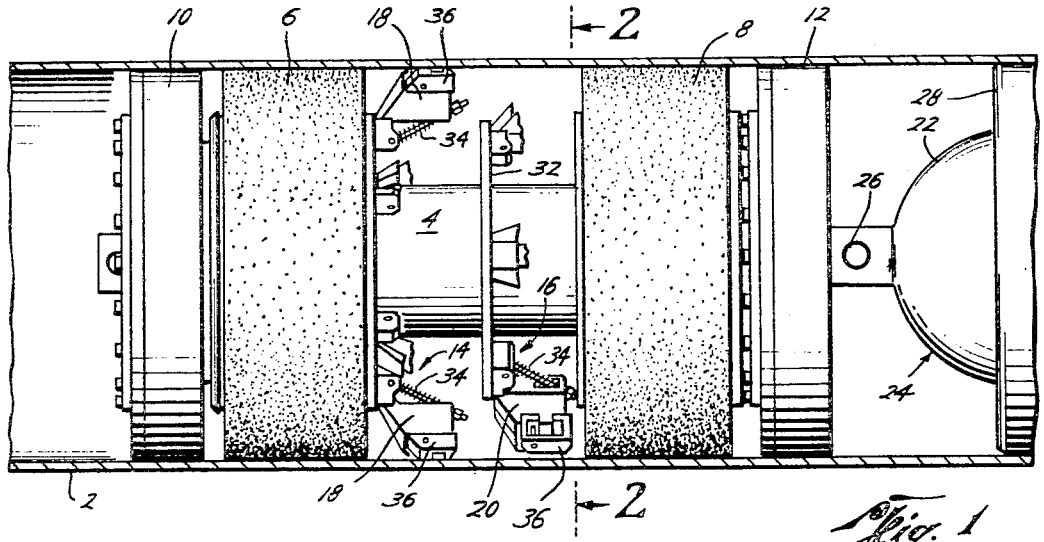
FIGURE 1 is a pictorial representation of a pipeline pigging apparatus disposed in a pipeline and embodying certain features of the present invention.

Referring now to FIGURE 1, there may be seen a pictorial representation of an exemplary form of the present invention. In particular, there is depicted a section of a typical pipeline 2 containing pigging apparatus for surveying the pipeline 2 for flaws, pits and leaks in its metallic wall. As may be seen, there is provided a solenoid 4 which is disposed about the center of a magnetizable core 40 for generating a unidirectional magnetic field. A pair of circular-shaped brush assemblies 6 and 8 with steel bristles are disposed at the ends of the core so as to conduct magnetic flux from the magnetized core circumferentially throughout the wall of the pipeline 2.

As hereinbefore stated, it is preferable that the brush assemblies 6 and 8 not bear any substantial portion of the weight of the pig. Accordingly, guide members or "packers" 10 and 12 may be provided at each end of the pig to support the pig in the pipeline 2. These packers or cups 10 and 12 may be of any conventional design and are preferably sufficiently yieldable so as not to significantly impede movement of the pig through the pipeline 2. However, it is also a function of the front packet 10 to trap fluid urged against it from behind the pig so as to provide means by which the pig is driven through the pipeline 2.

As also hereinbefore stated, it is the purpose of the pig to obtain indication of flaws, pits, and leaks along the length of the pipeline 2. Accordingly, a pair of detector assemblies 14 and 16, each having a plurality of arcuately spaced-apart detectors 18 and 20, may be disposed between the two brush assemblies 6 and 8 and concentrically about the solenoid 4 and core. As will hereinafter be explained in detail, the two detector assemblies 14 and 16 are angularly positioned, one to the other, so that the detectors 18 and 20 are in non-alignment with each other longitudinally of the pipeline 2.

It will be apparent that it is necessary for the pig shown in FIGURE 1 to be self-contained and self-sufficient with respect to power, recording circuitry, etc. Accordingly, a power pack 22 containing conventional power and signal recording circuitry may be disposed in a separate self-contained housing 24 which may be pivotally linked to the pig by a wrist pen 26 or other suitable linking means for providing a flexible connection therebetween. The housing 24 may also be provided with one or more packers 28 to support it in the pipeline 2 and to aid in trapping fluid in the pipeline 2 to drive the entire pigging apparatus as hereinbefore described.

The sensing elements (see FIGURE 3) in the detectors 18 and 20 may be of any suitable design, and may include flux leakage coils, eddy current sensing coils, and magnetometers, as well as thermistors or semi-conductors as hereinbefore suggested. As will hereinafter be explained in detail, each detector 18 or 20 may be pivotally attached to the base plate 30 or 32, and may be spring-loaded by means of a mainspring 34 so as to be constantly outwardly and yieldably urged against the inside wall of the pipeline 2. As hereinbefore stated, however, it is particularly desirable that each detector 18 and 20 yield readily to irregularities and deformites in the shape and diameter of the pipeline 2 while tending to maintain constant physical contact therewith. Accordingly, each detector shoe assembly 36 is also preferably individually pivotally connected to the detector 18 or 20, in a preselected manner, so as to better enable it to ride over such irregularities and deformities in the pipeline 2.

Figure 2:
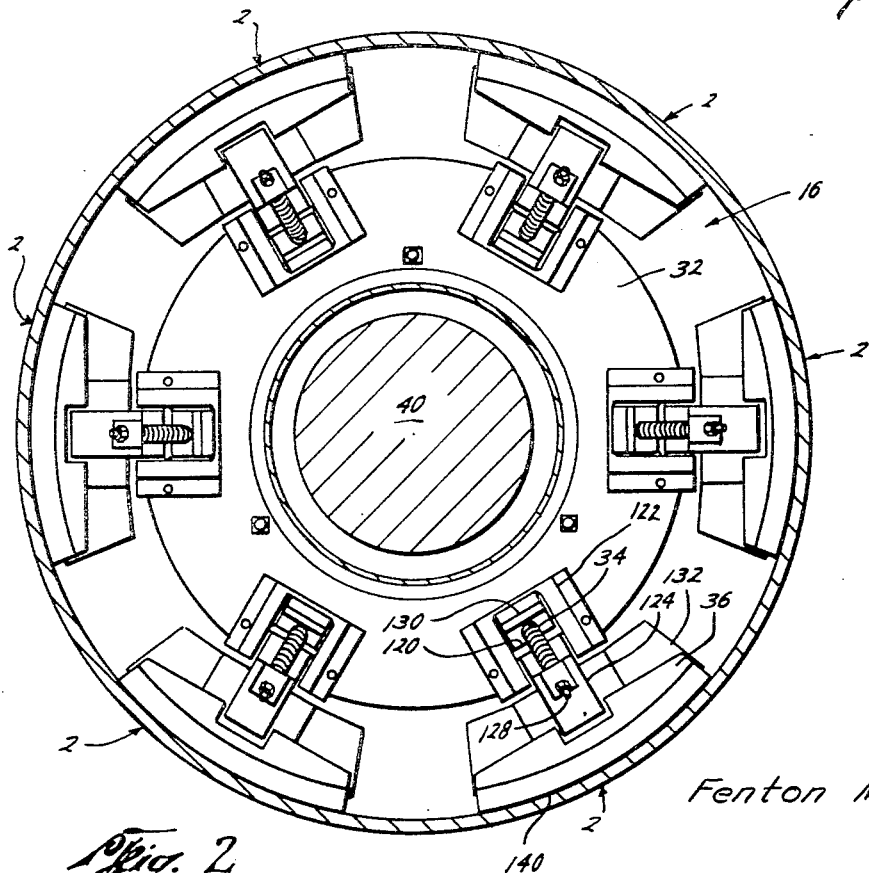
FIGURE 2 is a cross-sectional view of a portion of the apparatus depicted generally in FIGURE 1, wherein emphasis is given to the design and arrangement of a portion of the detection apparatus.

Referring now to FIGURE 2, there may be seen a cross-sectional representation of the pig depicted in FIGURE 1, such cross section being taken at a point immediately behind the rear detector assembly 16. In particular, there may be seen the core 40 with the base plate 32 concentrically mounted thereon and supporting six equally spaced-apart detectors 20. Each such detector 20 may be further seen to be composed of the shoe assembly 36, striker plate 132, shoe pivot bracket 124, compressed spring 34, spring rod 128, and shoe support bracket 122, hereinbefore discussed. However, it should be noted that the contact surface 140 of each shoe assembly 36 is preferably curved to conform to the inside wall of the pipeline 2.

It may be seen in FIGURE 1 that the front detector assembly 14 is identical to the rear detector assembly 16 depicted in FIGURE 2, in that the base plate 30 supports six equally spaced-apart detectors 18 each composed of a shoe assembly 36, striker plate 132, shoe pivot bracket 124, compressed spring 34, spring rod 128, and shoe support bracket 122. The spring rod pivot pin 130 and the retaining pin 120 may also be seen in FIGURES 3 and 4, and the contact surface 140 of each shoe assembly 36 may also be seen to be similarly curved to fit snugly against the inside surface of the pipeline 2.

The only significant difference between the front and rear detector assemblies 14 and 16 is that the two assemblies 14 and 16 are preferably mounted on the pig 30 degrees out of longitudinal alignment with respect to each other in order to provide full circumferential scanning of the pipeline 2 at all times irrespective of the position of the pig inside the pipeline 2. As hereinbefore stated, the pig may be required to traverse sections of pipeline 2 which are of different inside diameters, and may also be required to pass through the seats of valves which may be interconnected therein at various locations. Since the detectors 18 and 20 will necessarily be required to expand or contract radially with respect to the core 40, in such cases, it is necessary to provide for maximum contraction of the detectors 18 and 20 by spacing them apart. Although it is desirable to keep the spacing to a minimum even during maximum expansion (during travel through sections of the pipeline 2 wherein the inside diameter is at a maximum), it is necessary to provide at least some such spacing to avoid binding between the shoe assemblies 36 when the pig traverses sections of the pipeline 2 having a reduced diameter. Accordingly, it will be apparent that not all of the pipeline 2 will be surveyed unless the detectors 20 of the rear detector assembly 16 are rotated to scan the portions of the pipeline 2 between the detectors 18 of the front detector assembly 14. Similarly, the front detectors 18 must necessarily scan the portions of the pipeline 2 wall lying between the detectors 20 of the rear detector assembly 16.

As hereinbefore stated, the front and rear detector assemblies 14 and 16 depicted in FIGURE 1 herein, are rotated 30 degrees out of alignment to achieve a full 360 degree scan of the pipeline 2. However, the angle of rotation is dependent upon the number of detectors incorporated in each assembly, and if a number other than six is used, the angle of rotation will necessarily be other than 30 degrees.

Figure 3:
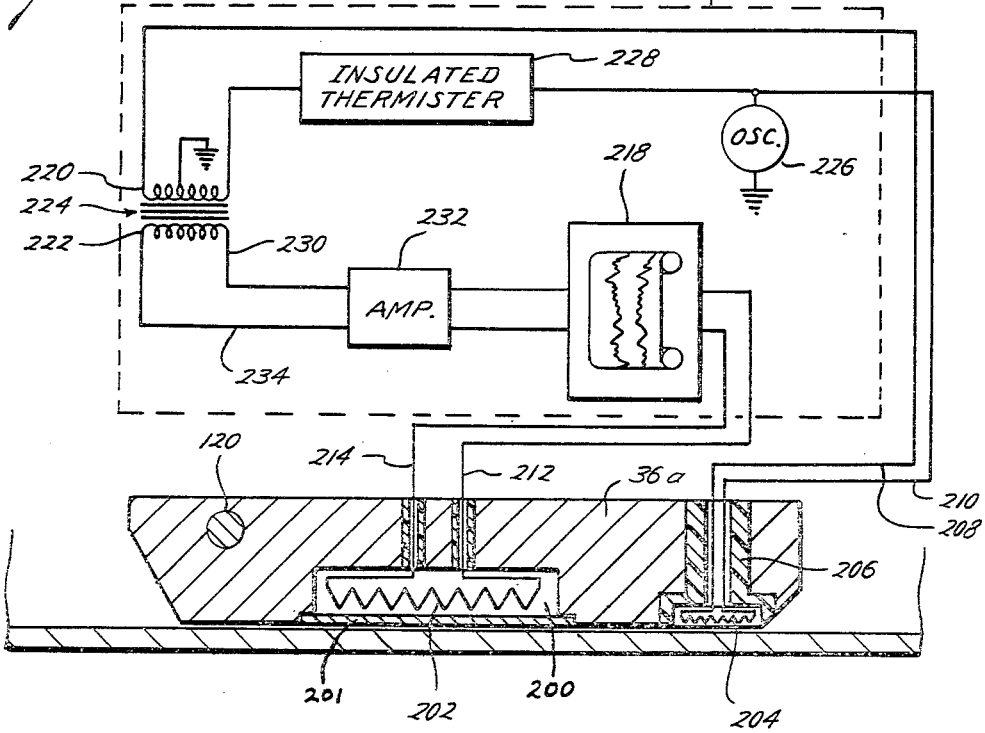
FIGURE 3 is a functional representation of a detector shoe depicted generally in FIGURES 1 and 2, including a schematic representation of one form of temperature-sensitive apparatus to be used in the present invention.

Referring now to FIGURE 3, there may be seen a functional representation of an exemplary form of detector shoe 36, wherein the body of each shoe 36A is provided with a cavity 200 to enclose one or more different sensors such as a flux leakage coil 202 for detecting flaws in the wall of the pipeline 2. A replaceable insert 201 may be provided to protect the coil 202 and to provide a bearing surface for the shoe 36A. In addition, there is preferably provided a temperature-sensitive device such as coil 204 of any suitable material having a high resistance temperature coefficient such as an alloy of 70% nickel and 30% iron. It is preferable to position coil 204 as close as reasonably possible to the wall of the pipeline 2 to achieve maximum sensitivity to the temperature of the gas adjacent the wall of the pipeline 2, since it is the temperature of the pipeline 2 (and thus the gas adjacent thereto) which is most directly indicative of the presence of a leak in the pipeline 2.

In addition, it is desirable that the coil 204 respond primarily to the temperature of the gas adjacent the wall of the pipeline 2, and only secondarily to the temperature of the shoe 36A, since friction between the shoe 36A and the wall of the pipeline 2 may adversely affect the measurements and indications sought to be obtained. Accordingly, an insulator 206 may be provided to thermally isolate the coil 204 from the shoe 36A, and to support the coil 204 and the conductors 208 and 210 connected thereto.

As may be further seen, conductors 208 and 210 may extend into the recording package depicted in FIGURE 1 and suggested in FIGURE 3 by the heavy dashed line 216. As also suggested but not specifically depicted in FIGURE 3, conductors 212 and 214, which interconnect with the flux leakage detector coil 202, may also extend into the recording package to connect with a magnetic tape recorder 218 or other suitable recording apparatus and power supplies.

Referring in detail to FIGURE 3, it may be seen that conductor 208 connects with one end of the primary winding 220 of a transformer 224. The other conductor 210 from the temperature sensing coil 204 interconnects with an A.C. power source 226 and one terminal of a second thermally-insulated thermistor 228, such as coil 204, which has its opposite terminal connected to the other end of the primary winding 220 of transformer 224. The described circuit arrangement connected with temperature-sensitive device 204 thus comprises the previously-mentioned bridge circuit.

The secondary winding 222 of transformer 224 may be seen to be connected across the input terminals of a suitable amplifier 232, by means of conductors 230 and 234. Thus, signals generated by the bridge circuit are coupled to amplifier 232 by means of transformer 224, and the suitably amplified output signals from amplifier 232 may be applied to and recorded by recorder 218 in correlation with the flaw detection signals concurrently arriving by way of conductors 212 and 214.

Figure 4:
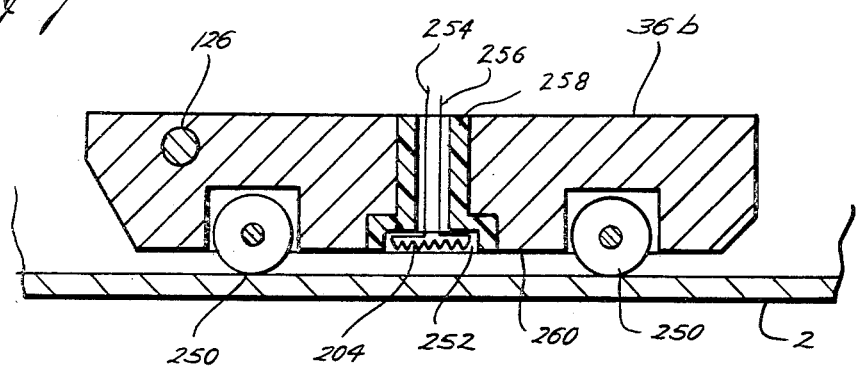
FIGURE 4 is a functional representation of another form of a detector shoe containing a temperature-sensing device for practicing the present invention in one embodiment.

Referring now to FIGURE 4, there may be seen a simplified functional representation of a different embodiment of the present invention, wherein the shoe 36B may be provided with a plurality of rollers or wheels 250 positioned so as to space the bottom surface 260 of the shoe 36B close to but away from the inside surface of the pipeline 2. It is desirable that the spacing between the bottom surface 260 of the shoe 36B, and the pipeline 2, be kept as small as practical, since it is desirable that coil 204 be spaced as close to pipeline 2 as is reasonably possible as hereinbefore explained.

As may further be seen, a temperature sensitive coil 204 as previously described with respect to FIGURE 3, may be located in a small protective cavity 252 in the bottom surface 260 of the shoe 36B to respond to the temperature of the fluid adjacent the inside surface of the pipeline 2. In the case of the illustrative embodiment depicted functionally in FIGURE 4, it is the purpose of the cavity 252 merely to provide a recess for coil 204 to prevent it from being damaged if the adjacent portion of the bottom surface 260 of the shoe 36B is dragged over any debris or irregularity in the inside surface of the pipeline 2. Thus, the cavity 252 should preferably be made only deep enough to provide adequate protection for coil 204.

On the other hand, the lower temperature of the fluid which indicates the presence of the leak is due, as hereinbefore explained, to heat loss to the cold portion of the pipeline 2 around the leak. Thus, it is preferable that the cavity 252 be small enough so that the coil 204 is disposed as close to the inside surface of the pipeline 2 as is practical under the circumstances.

As may also be seen in FIGURE 4, coil 204 may be connected to the recording package (see FIGURE 1) by means of leads 254 and 256 which are isolated from shoe 36B by means of an insulator 258. Although shoe 36B will probably not generate the heat which may be expected when shoe 36A (in FIGURE 3) is dragged along the inside surface of the pipeline 2, it is preferable that the coil 204 be thermally isolated as much as possible from anything constituting either a heat source or heat sink, excepting the fluid adjacent the inside surface of the pipeline 2.

Although no auxiliary circuitry is specifically depicted in FIGURE 4, it should be understood that any or all of the circuitry included within the heavy dashed line 216 in FIGURE 3 may, also be incorporated with the exemplary embodiment suggested in FIGURE 4. It should be further understood that shoes 36A and 36B represented in FIGURES 3 and 4 may include any of the other detector shoe and arm components, such as the shoe pin 120, which are illustrated or suggested in FIGURES 1 and 2, and which are obviously necessary to achieve full 360 degree scanning of the inside circumference of the pipeline 2 in view of the irregularities in the shape, diameter, and inside surface of the pipeline 2 as have hereinbefore been discussed.

Many other modifications and variations may obviously be made in the present invention without departing significantly from its essential concept. Accordingly, it should be clearly understood that the methods and apparatus described herein and depicted in the accompanying drawings, are intended to be illustrative only, and are not intended as limitations on the present invention.

What is claimed is:

1. Apparatus for detecting leaks in a pipeline containing a fluid under pressure, said apparatus comprising
  an elongated body member adapted to be longitudinally disposed in said pipeline,
  forward supporting means located adjacent the forward end of said body member for trapping fluid in said pipeline and for slidably supporting said forward end of said body member in said pipeline,
  rearward supporting means located adjacent the rearward end of said body member for movably supporting said rearward end in said pipeline, and
  a plurality of detectors circumferentially disposed about said body member and each responsive to the temperature of said fluid adjacent the inside surface of said pipeline.

2. The apparatus described in claim 1, wherein said detectors are arranged in combination to scan substantially the entire inside circumference of said pipeline during longitudinal travel through said pipeline.

3. The apparatus described in claim 2, wherein said detectors are each independently urged against the inside surface of said pipeline.

4. The apparatus described in claim 3, wherein said plurality of detectors are composed of
  a first circumferential array of separate circumferentially spaced-apart detectors, and
  a second circumferential array of separate circumferentially spaced-apart detectors arranged in a generally trailing relationship to said first array of detectors.

5. The apparatus described in claim 4, wherein said detectors in said second array are circumferentially offset relative to said detectors in said first array so as to each scan the portion of said inside surface of said pipeline between two of said spaced-apart detectors in said first array.

6. The apparatus described in claim 5, wherein each of said detectors includes a thermistor arranged to sense the temperature of the fluid adjacent the inside surface of said pipeline.

7. The apparatus described in claim 6, wherein each of said detectors further includes a detector shoe for supporting said thermistor in a closely spaced relationship to the inside surface of said pipeline.

8. The apparatus described in claim 7, wherein each detector shoe is pivotally mounted at the free traveling end of a spring-loaded detector arm adapted to yieldably urge said shoe against the inside surface of said pipeline.

9. The apparatus described in claim 8, wherein each detector shoe is pivotally mounted on said detector arm at a point adjacent the leading edge of said shoe, and
  wherein said shoe contains spring means for urging the trailing edge of said shoe pivotally about said point and against said inside surface of said pipeline.

10. The apparatus described in claim 8, wherein each detector shoe is pivotally mounted on said detector arm at a point adjacent the trailing edge of said shoe, and
  wherein said shoe contains spring means for urging the leading edge of said shoe pivotally about said point and against said inside surface of said pipeline.

11. Apparatus for detecting leaks in a pipeline containing a fluid under pressure, said apparatus comprising
  a self-supporting body member adapted to be disposed in and moved through said pipeline,
  means carried by said body member for detecting the temperature of the pipeline and the fluid at the leak, said temperature detecting means comprising
  a temperature-sensitive device positioned closely adjacent the wall of the pipeline in direct thermal contact with fluid immediately adjacent the wall of the pipeline, whereby fluid escaping through a leak in the wall of the pipeline will have a refrigerating effect to cool the region immediately adjacent the leak and said said temperature-sensitive device will detect the cooled region.

12. The apparatus claimed in claim 11 and further including,
  a detector shoe urged against the inside surface of said pipeline,
  said detector shoe supporting a temperature-sensitive device therein.

13. The apparatus claimed in claim 12 wherein
  said detector shoe is provided with a small open cavity in the surface adjacent the pipeline wall.

said temperature-sensitive device being disposed in said open cavity, whereby fluid immediately adjacent the pipeline wall is in contact with said cavity and thus in direct thermal contact with the temperature-sensitive device, and means for thermally isolating said temperature-sensitive devices from the detector shoe.

14. The combination claimed in claim 11 and including, additional temperature-sensitive devices disposed circumferentially about said body member and closely adjacent the pipeline wall in direct thermal contact with fluid immediately adjacent respective portions of the pipeline wall, said temperature-sensitive devices being arranged to scan for leaks throughout the full 360 degrees of the inner circumference of said pipe line.

15. The combination claimed in claim 14 and including, a plurality of electrical bridge circuits, each of said temperature-sensitive devices comprising one arm of a responsive one of said bridge circuits, a plurality of second temperature-sensitive devices each comprising a second arm in a responsive one of said bridge circuits, said second temperature-sensitive devices being carried by said body member at locations thereon to be substantially nonresponsive to cooled regions produced by leaks in the pipeline wall.

References Cited

UNITED STATES PATENTS

| | | | |
|---|---|---|---|
| 2,383,455 | 8/1945 | Abadie. | |
| 2,731,826 | 1/1956 | Wiley | 73—40.5 |
| 3,132,506 | 5/1964 | Pritchett | 73—40.5 |
| 3,321,957 | 5/1967 | Blauder et al. | 73—40.5 |

LOUIS R. PRINCE, Primary Examiner

JEFFREY NOLTON, Assistant Examiner